March 31, 1931. J. M. WILSON 1,798,509

PISTON RING

Filed Nov. 6, 1929

INVENTOR
John M. Wilson.
By
ATTORNEY

UNITED STATES PATENT OFFICE

JOHN M. WILSON, OF NORMANDY, MISSOURI, ASSIGNOR TO FEDERAL PISTON RING CO. OF ST. LOUIS, MISSOURI, A CORPORATION OF MISSOURI

PISTON RING

Application filed November 6, 1929. Serial No. 405,094.

This invention relates to a certain new and useful improvement in piston or packing rings.

My invention has for an object the provision in a ventilated piston-ring of a plurality of by-passes, whereby lubricant ventilation through the ring is facilitated and efficient seating-engagement of the ring at its opposite axial ends with the cylinder-wall in the reciprocations of the piston obtained.

And with the above and other objects in view, my invention resides in the novel features of form, construction, arrangement, and combination of parts hereinafter described and pointed out in the claims.

In the accompanying drawing,—

Figure 1:
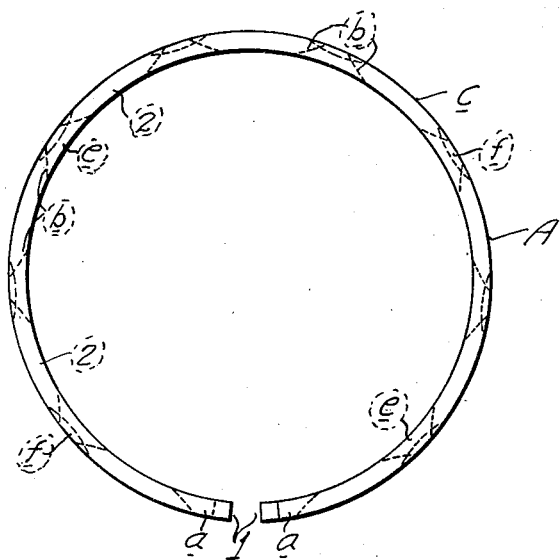
Figure 1 is an end plan view of a piston-ring embodying my invention.
Figure 2:
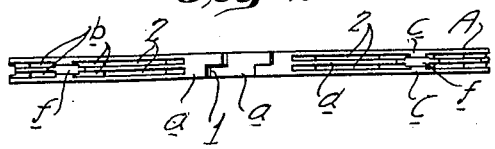
Figure 2 is an elevational view of the ring.

Referring now more in detail and by reference characters to the drawing, which illustrates a preferred embodiment of my invention, the ring A is generally of standard split resilient type having a step-joint, as at 1, at its co-operating or meeting ends $a$, $a$. Intermediate its ends $a$, $a$, the ring A is suitably formed with two annular circumferentially parallel series of spaced slots 2, 2, which open upon the outer and inner peripheral faces of the ring, the end walls of each slot being preferably disposed obliquely, as at $b$, $b$, to the axial center of the ring, with the result that each of the several slots 2 is of lesser dimensions circumferentially along the inner than along the outer peripheral face of the ring.

The ring A is thus divided by the parallel annular series of slots 2 to include, as I might say, substantially three axially aligned portions, namely, the opposite axial end portions $c$, $c$, and the intermediate portion $d$, said ring-portions $c$, and $d$ being each adapted for scraping engagement at its outer peripheral face with the cylinder-wall, and said portions being integrally connected by the ring-ends $a$, $a$, and the circumferentially spaced intermediate ring-portions $e$. The several slots 2 also provide ventilating ducts or passages for permitting escape through the ring and into the crankcase of the engine of surplus lubricant that may be scraped from the cylinder-wall in and during the reciprocations of the piston.

Figure 3:
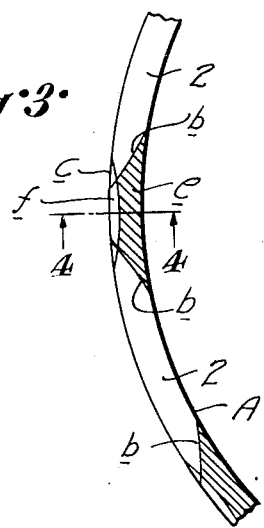
Figure 3 is a fragmental longitudinal sectional view of the ring.
Figure 4:
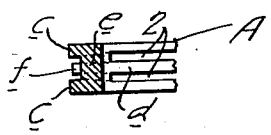
Figure 4 is a transverse sectional view of the ring taken approximately on the line 4—4, Figure 3.

Frequently, however, one or more of the ventilating ducts or passages 2 become clogged, preventing the free flow of lubricant therethrough and interfering with or retarding proper ventilation and functioning of the ring. Hence, the intermediate ring portion $d$ at preferably each of said connecting portions $e$ is arcuately recessed, as at $f$, upon its outer peripheral face, which recesses extend at their opposite ends intermediate the slots 2 of adjacent pairs, as best seen in Figure 3 whereby the ring A is provided with a corresponding number of so-called four-way by-passes connecting the several slots 2 for intercommunication along the outer peripheral face of the ring and freely permitting any excess or surplus lubricant in any one slot 2 to find escape through a communicating slot through the ring back into the engine crank-case.

Now, further, the usual ring having a plane peripheral face is so subjected to wear as the piston during its reciprocation moves through the circle of the stroke that the peripheral face of the ring gradually takes on an arcuate or curved contour, with the result that the ring, as so worn, fails to have the sharp bearing seat so essential for preventing the passage of oil and compression. In the present ring, however, by removing the surface metal at the recess $f$, I substantially create two separate surfaces, namely, the spaced outer peripheral faces of the axial ring end-portions $c$, $c$, which form efficient bearing-seats with the cylinder wall at the two angles at which the ring is tilted by and with the piston as it moves through the circle of a stroke.

My new ring is readily and economically manufactured and has been found exceedingly efficient in the performance of its intended functions.

I am aware that changes or modifications in the form, construction, arrangement, and combination of the several parts of the ring may be made and substituted for those herein shown and described without departing from the nature and principle of my invention.

Having thus described my invention, what I claim and desire to secure by Letters Patent is:

1. A piston ring provided intermediate its opposite end walls with parallel series of circumferentially aligned spaced slots and thereby divided to include axially aligned cylinder-wall-engaging peripheral opposite end and intermediate portions, said slots opening upon the outer and inner peripheral faces of the ring, the ring being also provided circumferentially with a series of spaced recesses in the peripheral face of said intermediate portion connecting the several slots for inter-communication.

2. A piston ring provided intermediate its opposite end walls with parallel series of circumferentially aligned spaced slots and thereby divided to include axially aligned cylinder-wall-engaging peripheral opposite end and intermediate portions, said slots being disposed in parallel pairs and each slot opening upon the outer and inner peripheral faces of the ring, the ring being also provided circumferentially with a series of correspondingly spaced recesses in the peripheral face of said intermediate portion respectively connecting for inter-communication the slots of each pair one with the other and with the slots of an adjacent pair.

3. A piston ring provided intermediate its opposite end walls with parallel series of circumferentially aligned spaced slots and thereby divided to include axially aligned cylinder-wall-engaging peripheral opposite end and intermediate portions, said slots being disposed in parallel pairs and each slot opening upon the outer and inner peripheral faces of the ring, the ring being also provided circumferentially with a series of correspondingly spaced arcuate recesses in the peripheral face of said intermediate portion respectively connecting for inter-communication the slots of each pair one with the other and with the slots of an adjacent pair, said recesses extending at their ends intermediate the slots of adjacent pairs.

4. A piston ring provided circumferentially intermediate its opposite end walls with parallel series of spaced slots and thereby divided to include axial cylinder-wall engaging peripheral end portions and an intermediate cylinder-wall engaging peripheral portion, said slots opening upon the outer and inner peripheral faces of the ring, the ring being also provided circumferentially with a series of arcuate recesses in the peripheral face of said intermediate portion, substantially as and for the purposes described.

In testimony whereof, I have signed my name to this specification.

JOHN M. WILSON.